United States Patent
Lee et al.

(10) Patent No.: US 11,675,522 B2
(45) Date of Patent: Jun. 13, 2023

(54) MEMORY SYSTEM AND OPERATING METHOD THEREOF

(71) Applicant: SK hynix Inc., Gyeonggi-do (KR)

(72) Inventors: Won Hyoung Lee, Gyeonggi-do (KR); Ji Yeun Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/464,468

(22) Filed: Sep. 1, 2021

(65) Prior Publication Data
US 2022/0365682 A1 Nov. 17, 2022

(30) Foreign Application Priority Data
May 12, 2021 (KR) .................. 10-2021-0061361

(51) Int. Cl.
*G06F 3/06* (2006.01)
*G06F 11/10* (2006.01)

(52) U.S. Cl.
CPC .............. *G06F 3/065* (2013.01); *G06F 3/064* (2013.01); *G06F 3/0619* (2013.01); *G06F 3/0652* (2013.01); *G06F 3/0673* (2013.01); *G06F 11/1068* (2013.01)

(58) Field of Classification Search
CPC ........ G06F 3/065; G06F 3/064; G06F 3/0652; G06F 3/0673; G06F 11/1068
See application file for complete search history.

(56) References Cited

U.S. PATENT DOCUMENTS

| | | | |
|---|---|---|---|
| 7,275,140 B2 | 9/2007 | Paley | |
| 2015/0113237 A1* | 4/2015 | Kim ................... | G11C 16/3427 711/162 |
| 2019/0107961 A1* | 4/2019 | Lee ....................... | G06F 3/0653 |

FOREIGN PATENT DOCUMENTS

KR 1020180126118 A 11/2018

* cited by examiner

*Primary Examiner* — Guy J Lamarre
(74) *Attorney, Agent, or Firm* — IP & T Group LLP

(57) ABSTRACT

Disclosed is an operating method of a memory system that includes a plurality of memory blocks, the operating method including a first step of copying, in order to recover sudden power-off of the memory system, data of an open block to a selected block among the plurality of memory blocks while maintaining map data associated with the open block and open block identification information; a second step of erasing the open block; and a third step of copying the data, which is copied to the selected block, to the erased open block.

21 Claims, 8 Drawing Sheets

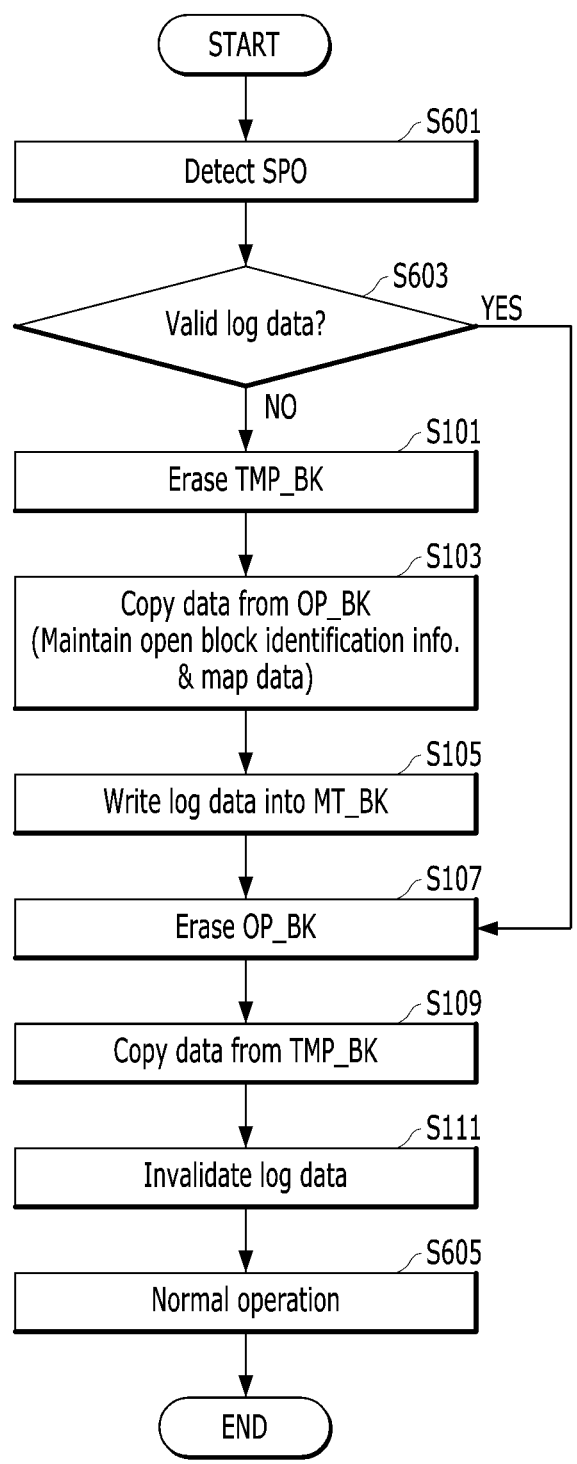

MEMORY SYSTEM AND OPERATING METHOD THEREOF

CROSS-REFERENCE TO RELATED APPLICATION(S)

The present application claims priority under 35 U.S.C. § 119(a) to Korean Patent Application No. 10-2021-0061361, filed on May 12, 2021, the disclosure of which is incorporated herein by reference in its entirety.

BACKGROUND

1. Field

Various embodiments of the present disclosure generally relate to a memory system and an operating method thereof.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments of the present disclosure are directed to a memory system that may perform a sudden power-off recovery operation, and an operating method of the memory system.

In accordance with an embodiment of the present disclosure, an operating method of a memory system including a plurality of memory blocks includes: a first operation of copying, in order to recover sudden power-off of the memory system, data of an open block to a selected block among the plurality of memory blocks while maintaining map data associated with the open block and open block identification information; a second operation of erasing the open block; and a third operation of copying the data, which is copied to the selected block, to the erased open block.

The operating method may further include: storing valid log data in a meta block in response to completion of the first operation.

The valid log data may indicate that the data of the open block is copied to the selected block.

The operating method may further include invalidating the valid log data, which is stored in the meta block, in response to completion of the third operation.

The performing of the second operation may include: identifying the open block based on the open block identification information, which is maintained in a previous power cycle, when the valid log data is stored in the meta block; identifying the selected block, which is used in the previous power cycle, based on the valid log data; and erasing the open block based on the identified open block and the selected block when the memory system is powered up.

The performing of the first operation may include: identifying the open block based on the open block identification information, which is maintained in a previous power cycle, when invalid log data is stored in the meta block; and copying the data of the open block to the selected block based on the identified open block when the memory system is powered up.

The operating method may further include performing a normal operation in response to completion of the third operation, and the performing of the normal operation may include successively-storing new data in an erased page of the open block.

The performing of the normal operation may further include accessing the open block with reference to the map data.

The first operation may include: performing an error correction decoding operation on the data of the open block, and loading the error correction decoded data into a volatile memory; and performing an error correction encoding operation on the loaded data, and storing the error correction encoded data in the selected block.

In accordance with an embodiment of the present disclosure, a memory system includes: a memory device including a plurality of memory blocks; and a controller suitable for controlling the memory device, wherein the controller is further suitable for: copying, in order to recover from a sudden power-off, data of an open block to a selected block among the plurality of memory blocks while maintaining map data associated with the open block and open block identification information, erasing the open block, and copying the data, which is copied to the selected block, to the erased open block.

The controller may store valid log data in a meta block when the data of the open block is copied to the selected block.

The valid log data may indicate that the data of the open block is copied to the selected block.

The controller may invalidate the valid log data, which is stored in the meta block, when the data copied to the selected block is copied to the open block.

The controller may perform an operation of erasing an open block identified based on open block identification information which is maintained in a previous power cycle, when the valid log data is stored in the meta block and the memory system is powered up.

The controller may copy the data of the open block to the selected block among the plurality of memory blocks, based on open block identification information which is maintained in a previous power cycle, when invalid log data is stored in the meta block and the memory system is powered up.

The controller may perform, after copying the data from the selected block to the erased open block, a normal operation by successively storing new data in an erased page of the open block.

The controller may perform, after copying the data from the selected block to the erased open block, a normal operation by accessing the open block with reference to the map data.

The controller may copy the data of the open block to the selected block by performing an error correction decoding operation on the data of the open block and loading the error correction decoded data into a volatile memory, and performing an error correction encoding operation on the loaded data and storing the error correction encoded data in the selected block.

In accordance with an embodiment of the present disclosure, the method of performing a sudden power-off recovery operation includes: copying, when log information is not yet written into a third memory unit, write data from a first memory unit to a second memory unit while keeping, in the third memory unit, map data and identification information of the first memory unit; writing the log information into the third memory unit, the log information representing the copying; erasing the first memory unit; and moving the write data from the second memory unit to the erased first memory unit while invalidating the log information in the third memory unit.

The copying may include: performing an error-correction operation on the write data.

BRIEF DESCRIPTION OF THE DRAWINGS

FIGS. 5A to 5E and 6 are diagrams illustrating an operation of the memory system in accordance with an embodiment of the present disclosure.

DETAILED DESCRIPTION

Hereinafter, various embodiments of the present disclosure will be described in detail with reference to the accompanying drawings. In the following description, it is to be noted that only parts necessary for understanding the operation according to the present disclosure will be described, and the description of the other parts will be omitted so as not to obscure the subject matter of the present disclosure.

Figure 1:
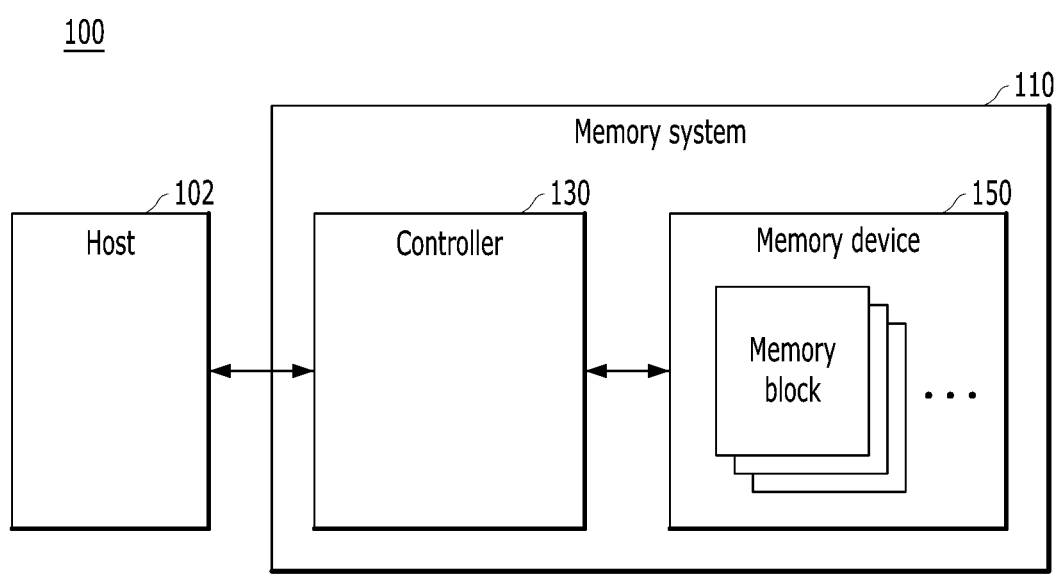
FIG. 1 is a diagram illustrating an example of a data processing system including a memory system in accordance with an embodiment of the present disclosure.

FIG. 1 is a diagram illustrating an example of a data processing system 100 including a memory system 110 in accordance with an embodiment of the present disclosure.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and a micro-SD card.

The memory system 110 may be embodied by various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program, and erase operations of the memory device 150.

For example, the controller 130 may map a logical address of the host 102 to a physical address of the memory device 150 in order to program data in the memory device 150. The controller 130 may perform an error correction encoding operation to add a parity bit to write data and store the write data to which the parity bit is added in the memory device 150.

In order to read data from the memory device 150, the controller 130 may convert the logical address of the host 102 into the physical address of the memory device 150, and access the memory device 150, with reference to map data of the memory system 110. The controller 130 may detect and correct an error in read data by performing an error correction decoding operation using the parity bit, and provide the host 102 with the error-corrected read data. The controller 130 may perform a plurality of operations, such as an address conversion operation, an operation of reading data from the memory device 150 and the error correction operation, in response to a read request from the host 102.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks 152, 154, 156 . . . each of which may include a plurality of pages, and each of the pages may include a plurality of memory cells coupled to a word line. In an embodiment, the memory device 150 may be a flash memory. The flash memory may have a 3-dimensional (3D) stack structure.

The flash memory device may store data in a memory cell array including memory cell transistors. The flash memory device may have a hierarchical structure of memory die, plane, memory block, and page. One memory die may receive one command at a time. The flash memory may include a plurality of memory dies. One memory die may include a plurality of planes, and the plurality of planes may process commands received by the memory die in parallel. Each of the planes may include a plurality of memory blocks. The memory block may correspond to the minimum unit of an erase operation. One memory block may include a plurality of pages. The page may correspond to the minimum unit of a write operation.

Figure 2:
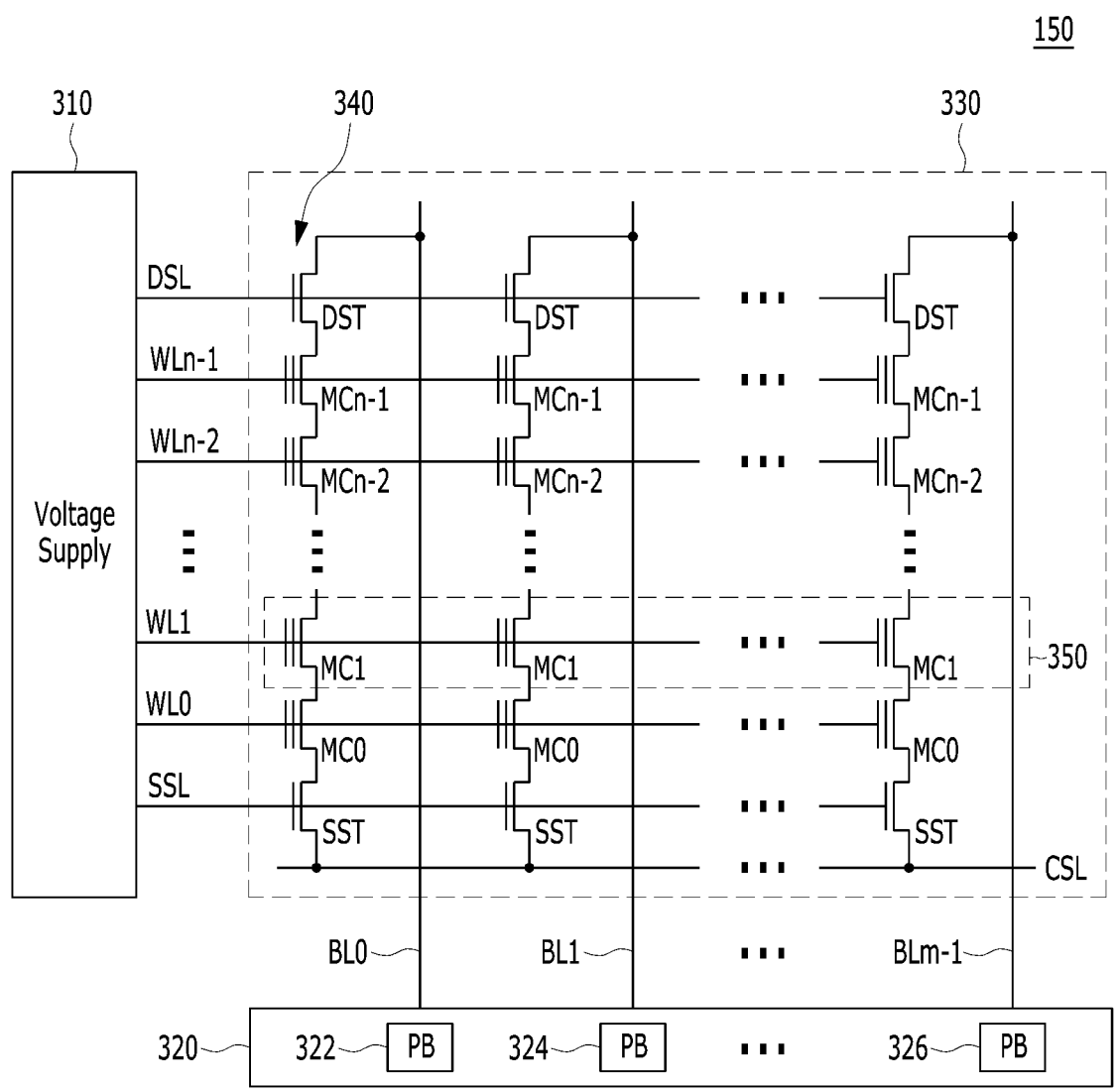
FIG. 2 is a circuit diagram illustrating a configuration of a memory cell array of a memory block in a memory device in accordance with an embodiment of the present disclosure.

FIG. 2 is a circuit diagram illustrating a configuration of a memory cell array of a memory block in the memory device 150 in accordance with an embodiment of the present disclosure.

Referring to FIG. 2, a memory block 330, which may correspond to any of the plurality of memory blocks included in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells or memory cell transistors MC0 to MCn−1 may be coupled in series. In an embodiment, each of the memory cells MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 2, the first cell string is coupled to the first bit line BL0, and the last cell string is coupled to the last bit line BLm−1. For reference, in FIG. 2, 'DSL' denotes a drain select line, 'SSL' denotes a source select line, and 'CSL' denotes a common source line.

Although FIG. 2 illustrates NAND flash memory cells, the invention is not limited in this way. It is noted that the memory cells may be NOR flash memory cells. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers PB respectively corresponding to columns (or bit lines) or column pairs (or bit line pairs), and each of the page buffers PB may include a plurality of latches (not illustrated).

In short, each memory block 330 of the memory device 150 may be coupled to a plurality of bit lines BL, a plurality of drain select lines DSL, a plurality of source select lines SSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a drain select transistor DST of each NAND string NS may be coupled to a corresponding bit line BL, and a source select transistor SST of each NAND string NS may be coupled to a common source line CSL. Memory cells MC may be provided between the drain select transistor DST and the source select transistor SST of each NAND string NS. In other words, a plurality of memory cells may be realized in each memory block 330 of the memory device 150.

The erase operation of the memory device 150 may be performed in units of memory blocks, and the program operation of the memory device 150 may be performed in units of pages. The memory device 150 may have different units of the program and erase operations, and not support an overwrite operation. Accordingly, in order to update data stored in an existing page, the controller 130 may store the data which is to be updated, in another page as valid data, and invalidate the data in the existing page.

Figure 3:
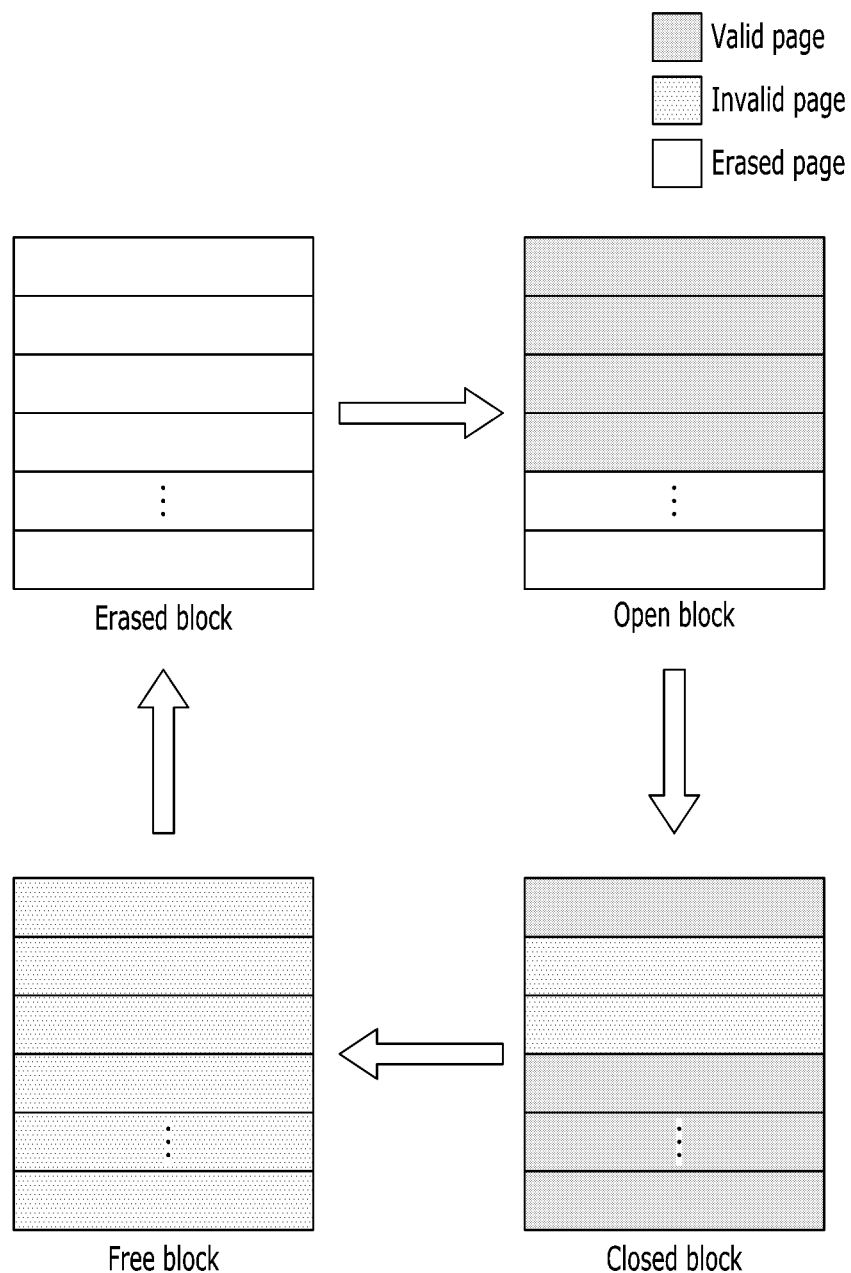
FIG. 3 is a diagram illustrating types of memory blocks according to program states of pages included in each of the memory blocks in accordance with an embodiment of the present disclosure.

FIG. 3 is a diagram illustrating types of memory blocks according to program states of pages included in each of the memory blocks in accordance with an embodiment of the present disclosure.

Sections illustrated for each block in FIG. 3 represent pages belonging to each of the memory blocks. A shaded section represents a valid page, a dot-patterned section represents an invalid page, and a blank section represents an erased page. The valid page may refer to a page in which valid data is stored. The controller 130 may access the valid page by converting a logical address of the host 102 into a physical address of the memory device 150 with reference to map data. The invalid page may refer to a page in which invalidated data is stored. In addition, the erased page may refer to a page in which all memory cells included in a corresponding page are in an erased state.

FIG. 3 illustrates an erased block as a type of memory block. The erased block which is a memory block in which all memory cells included in the corresponding memory block are in the erased state, may include only erased pages.

FIG. 3 illustrates an open block as a type of memory block. The open block, which is a memory block in which a program operation on all memory cells is not completed, may include erased pages. In the open block, data programmed recently may be stored in programmed pages. Data to be programmed later may be stored in the erase pages of the open block. When the program operation is completely performed on all the memory cells of the open block, and thus there are no more erased pages in the corresponding open block, the controller 130 may determine the corresponding open block as a closed block. The closed block may refer to a memory block in which the program operation is no longer performed until an erase operation is performed on the memory block.

FIG. 3 illustrates a closed block as a type of memory block. Specifically, FIG. 3 illustrates the closed block including invalid pages as an example of the closed block.

When all pages of the closed block become invalid pages, the controller 130 may determine the closed block as a free block.

FIG. 3 illustrates a free block as a type of memory block. The free block may refer to a memory block in which all programmed pages are invalid pages. The free block may be immediately erased without requiring an operation such as garbage collection operation. When the open block used to store data becomes the closed block, the controller 130 may make the free block the erased block, and determine the erased block as a new open block.

Each of the memory blocks included in the memory device 150 may correspond to any of the erased block, the open block, the closed block and the free block.

When sudden power-off occurs in the memory system 110, data of the open block may be damaged. For example, when the sudden power-off occurs in the memory system 110, data already programmed in the open block may be damaged. In addition, memory cell distribution of the erases pages of the open block may also be damaged. When the memory system 110 programs data in the erased pages without performing a recovery operation on the open block, the data programmed in the erased pages may also be damaged.

The memory system 110 may perform a sudden power-off recovery operation in a next power cycle to prevent the reliability of data stored in the open block from deteriorating due to the sudden power-off. A power cycle may refer to one cycle from the power-up to the power-off of the memory system 110. That is, the memory system 110 may perform the sudden power-off recovery operation when the memory system 110 is powered up after the sudden power-off occurs.

As a first example of the sudden power-off recovery operation, the memory system 110 may program dummy data in a first erased page of the open block. The first erased page may refer to a page that can be next programmed to a last programmed page among the erased pages of the open block.

As a second example of the sudden power-off recovery operation, the memory system 110 may erase the free block, and copy the data stored in the open block to the erased free block.

The memory system 110 may program data continuously across a plurality of memory dies that may operate in parallel. The memory system 110 may generate a parity by performing a parallel parity operation, for example, a chip-kill operation, on data of a plurality of pages that are programmed in parallel. That is, data of the plurality of pages across the plurality of memory dies of the memory device 150 may be closely related to one another.

When performing the sudden power-off recovery operation according to the first example, the memory system 110 needs to calculate data to be programmed not only on the first erased page but also on pages related thereto, and perform a program operation on the first erased page and related pages. Accordingly, the sudden power-off recovery operation according to the first example may require excessive operations. Therefore, a case in which the memory system 110 performs the sudden power-off recovery operation according to the second example is described below.

There is a case where the sudden power-off occurs again while the memory system 110 performs the sudden power-off recovery operation, and the memory system 110 repeatedly performs the sudden power-off recovery operation in the next power cycle. When the memory system 110 generates a new open block by erasing the free block whenever repeatedly performing the sudden power-off recovery operation, the free blocks included in the memory device 150 may be exhausted early. When the free blocks of the memory device 150 are exhausted early, the memory system 110 may not be used normally even though the lifespan of the memory blocks remains. Accordingly, there is a need for a memory system 110 that prevents the free blocks included in the memory device 150 from being exhausted even during repeated sudden power recovery operations.

According to an embodiment, the memory system 110 may determine an open block to be restored, based on open block identification information stored therein during the sudden power-off recovery operation. The memory system 110 may copy data stored in the open block, to the erased free block. The memory system 110 may not update the open block identification information and map data of the data stored in the open block, even after the copying is completed. Even when the sudden power-off recovery operation is repeatedly performed, the open block identification information may be maintained. Accordingly, when repeatedly performing the sudden power-off recovery operation, the memory system 110 may recover the open block at the time of the sudden power-off rather than consuming the free block as another open block to which the data of the open block at the time of the sudden power-off is copied.

Instead of updating the open block identification information, the memory system 110 may store in the memory device 150, log data for identifying the free block to which the data is copied. In addition, the memory system 110 may remove damaged data of the open block by erasing the open block, may copy the data, which is copied to the free block, back to the open block, and may invalidate the log data.

The memory system 110 in accordance with an embodiment is described in detail with reference to FIGS. 4 to 6.

Figure 4:
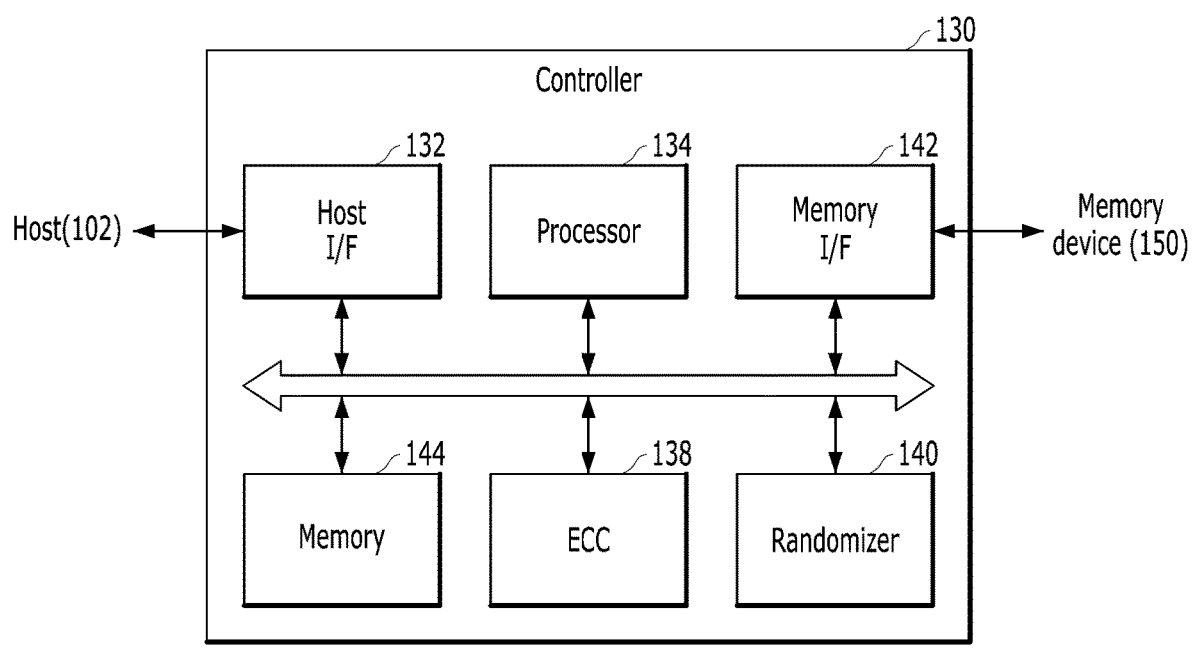
FIG. 4 is a diagram illustrating in detail a controller included in the memory system in accordance with an embodiment of the present disclosure.

FIG. 4 is a diagram illustrating in detail the controller 130 included in the memory system 110 in accordance with an embodiment of the present disclosure.

The controller 130 may include a host interface (I/F) 132, a processor 134, an error correction code (ECC) component 138, a memory I/F 142, and a memory 144 all operatively coupled via an internal bus.

The host I/F 132 may be configured to process a command and data of the host 102, and may communicate with the host 102 through one or more of various communication standards or interfaces such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host 102.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

The processor 134 may drive the FTL and perform a foreground operation corresponding to a request received from the host 102. For example, the processor 134 may control a write operation of the memory device 150 in response to a write request from the host and control a read operation of the memory device 150 in response to a read request from the host.

Also, the controller 130 may perform a background operation onto the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

The memory 144 may serve as a working memory of the memory system 110 and the controller 130, and may store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 illustrates the memory 144 disposed within the controller 130. In an embodiment, the memory 144 may be implemented as an external volatile memory device, and the memory 144 may have a memory interface for inputting and outputting data to and from the controller 130.

As described above, the memory 144 may store data required for performing a data write/read operation between the host and the memory device 150 and data when the data write/read operation is performed. In order to store such data, the memory 144 may include a program memory, data memory, write buffer/cache, read buffer/cache, data buffer/cache, map buffer/cache or the like.

The ECC component 138 may detect and correct an error contained in the data read from the memory device 150. In other words, the ECC component 138 may perform an error correction decoding process to the data read from the memory device 150 through an ECC value used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and may output an error correction fail signal.

The ECC component 138 may include an ECC encoder and an ECC decoder. The ECC encoder may generate data with a parity bit by performing error correction encoding on data to be programmed into the memory device 150, and the data with the parity bit may be stored in the memory device 150. The ECC decoder detects and corrects errors included in data read from the memory device 150 when reading the data stored in the memory device 150.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to any specific structure. The ECC component 138 may include all circuits, modules, systems or devices for error correction.

The randomizer 140 may randomize data to be stored in the memory device 150, and de-randomize data read from the memory device 150. The randomizer 140 may randomize and de-randomize data by calculating a seed value. When the data to be stored in the memory device 150 is randomized, a bit having a value of "0" and a bit having a value of "1" may be evenly distributed in data programmed in memory cells connected to bit lines of the memory device 150 or memory cells connected to word lines thereof. For example, error correction encoded data may be randomized by the randomizer 140, and provided to the memory device 150. In addition, the data read from the memory device 150 and de-randomized may be error correction decoded by the ECC component 138.

Hereinafter, the operation of the memory system 110 according to an embodiment is described in detail with reference to FIGS. 5A to 5E and 6.

FIGS. 5A to 5E are diagrams illustrating the sudden power-off recovery operation of the memory system 110 in accordance with an embodiment of the present disclosure.

Figure 5A:
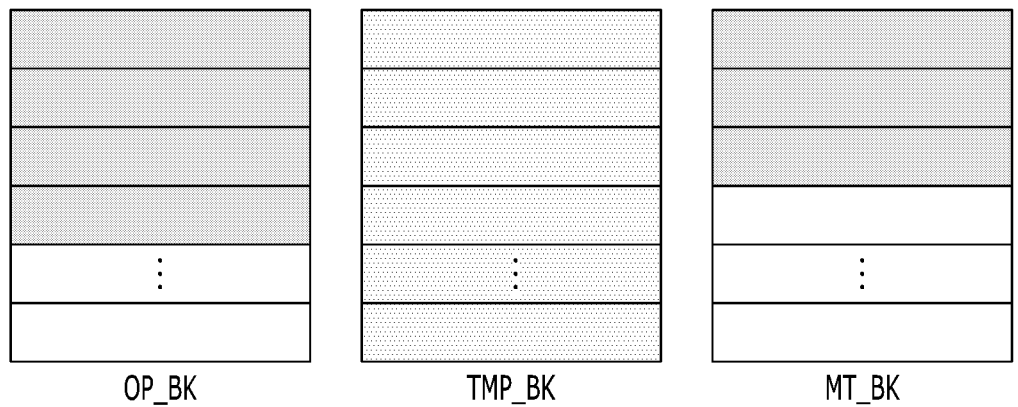

FIG. 5A illustrates a plurality of memory blocks that may be included in the memory device 150.

FIG. 5A illustrates an open block OP_BK among the plurality of memory blocks. As described with reference to FIG. 2, the open block OP_BK may be a memory block in which data storage is not completed. The processor 134 may determine which memory block is the open block OP_BK, based on open block identification information. The open block identification information may indicate which memory block among the memory blocks included in the memory device 150 is the open block OP_BK.

FIG. 5A illustrates a temporary block TMP_BK among the plurality of memory blocks. The temporary block TMP_BK may be a memory block in which data of the open block OP_BK is temporarily stored during a sudden power-off recovery operation according to an embodiment. For example, the temporary block TMP_BK may be selected from free blocks of the memory device 150.

FIG. 5A illustrates a meta block MT_BK among the plurality of memory blocks. Various meta data including open block identification information, map data and log data may be stored in the meta block MT_BK. The memory device 150 may include a plurality of meta blocks MT_BK. FIG. 5A illustrates a meta block MT_BK in an open block state among the plurality of meta blocks MT_BK.

FIG. 5A illustrates states of the open block OP_BK, the temporary block TMP_BK and the meta block MT_BK before the sudden power-off recovery operation of the memory system 110 is performed. FIGS. 5B to 5E illustrates states of the open block OP_BK, the temporary block TMP_BK and the meta block MT_BK in a process in which the sudden power-off recovery operation is performed on the memory blocks illustrated in FIG. 5A. The open block OP_BK, the temporary block TMP_BK and the meta block MT_BK illustrated in FIGS. 5B to 5E may correspond to those described with reference to FIG. 5A. Hereinafter, the sudden power-off recovery operation of the memory system 110 is described with reference to FIGS. 5B to 5E.

Figure 5B:
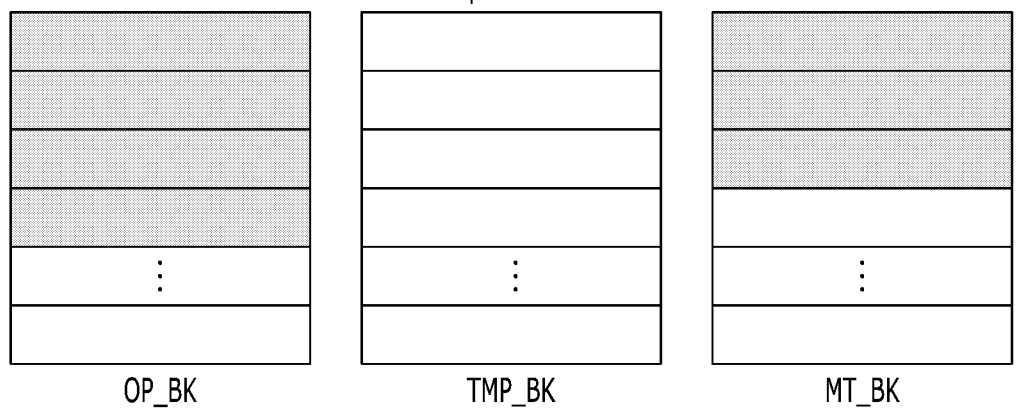

Referring to FIG. 5B, in operation S101, the processor 134 may select any of the free blocks of the memory device 150 as the temporary block TMP_BK, and control the memory device 150 to erase the selected temporary block TMP_BK. FIG. 5B illustrates the erased temporary block TMP_BK.

Figure 5C:
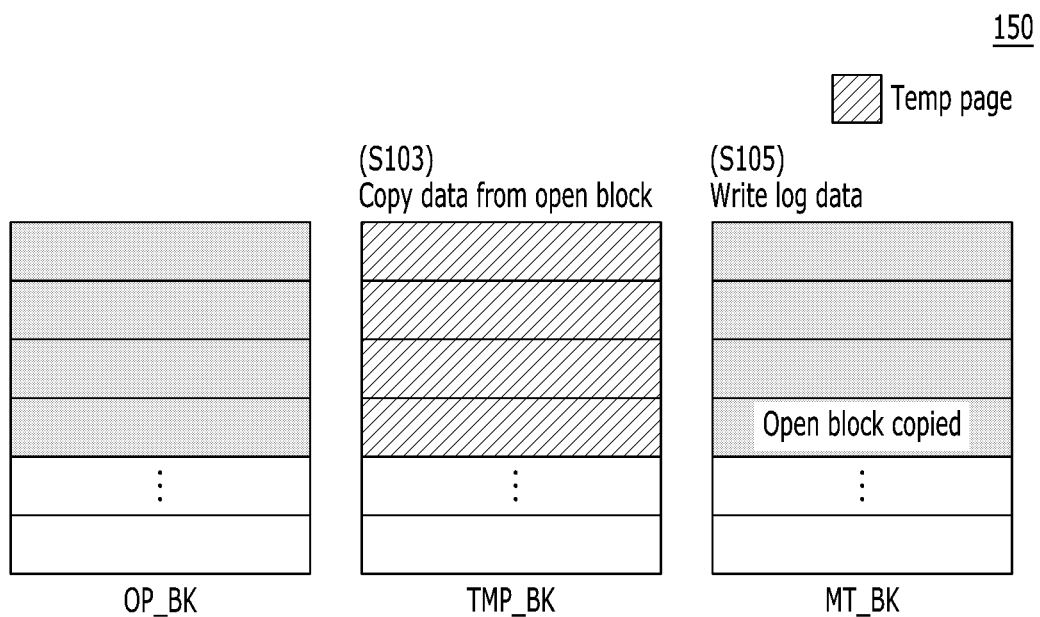

Referring to FIG. 5C, in operation S103, the processor 134 may copy data from the open block OP_BK to the temporary block TMP_BK. For example, the processor 134 may copy data by loading data of the open block OP_BK into the memory 144 and storing the data, loaded into the memory 144, in the temporary block TMP_BK. The ECC component 138 may perform de-randomization and error correction decoding operations on the data loaded into the memory 144, and perform error correction encoding and randomization operations on the data to be stored in the temporary block TMP_BK, thereby recovering the damaged data of the open block OP_BK, and guaranteeing the reliability of the data copied to the temporary block TMP_BK.

In some embodiments, each page of the memory blocks may include a spare area for storing a logical address of data stored in the corresponding page.

A page of the temporary block TMP_BK to which the data copied is stored may be referred to as a temporary page. In FIG. 5C, the temporary pages are indicated by hatched sections.

Even after the data of the open block OP_BK is copied to the temporary block TMP_BK, the processor 134 may not remove open block identification information, the data of the open block OP_BK and map data associated with the open block OP_BK. That is, the open block identification information and the map data may be maintained in the meta block MT_BK, and the data of the open block OP_BK may be maintained in the open block OP_BK. Accordingly, the processor 134 may perform a recovery operation on the open block OP_BK instead of the temporary block TMP_BK with reference to the open block identification information, even though sudden power-off occurs again during the sudden power-off recovery operation.

In operation S105, the processor 134 may store in the meta block MT_BK log data, which indicates that the data of the open block OP_BK has been copied to the temporary block TMP_BK. In FIG. 5C, a section in which "Open block copied" is recorded indicates a page in which the log data is stored.

For example, the log data may include address information of the temporary block TMP_BK and information on the progress of the sudden power-off recovery operation. When valid log data is detected as stored in the meta block MT_BK at the time of the sudden power-off recovery operation, the processor 134 may perform the sudden power-off recovery operation without operations S101, S103 and S105.

Figure 5D:
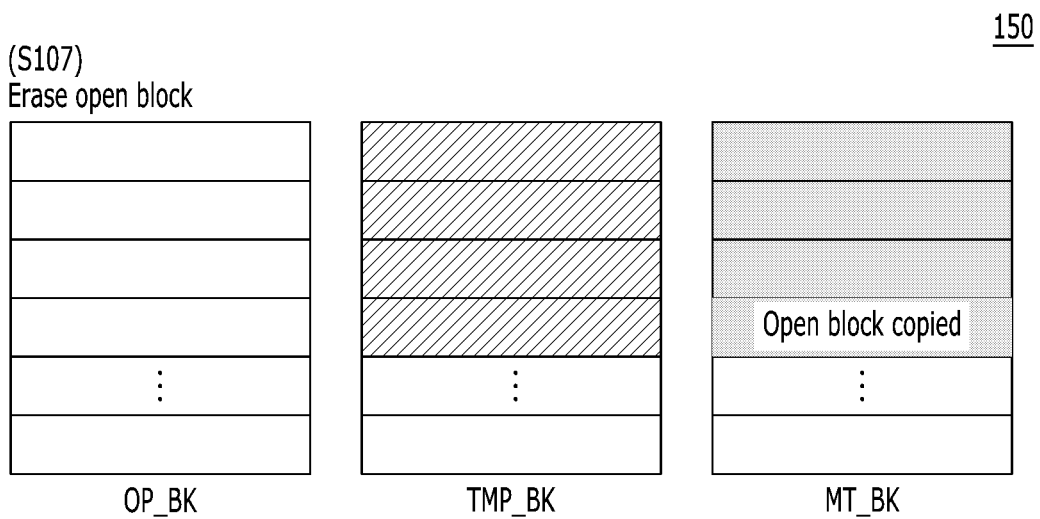

Referring to FIG. 5D, in operation S107, the processor 134 may control the memory device 150 to erase the open block OP_BK. Accordingly, the data of the open block OP_BK that may have been damaged due to the sudden power-off may be removed.

Figure 5E:
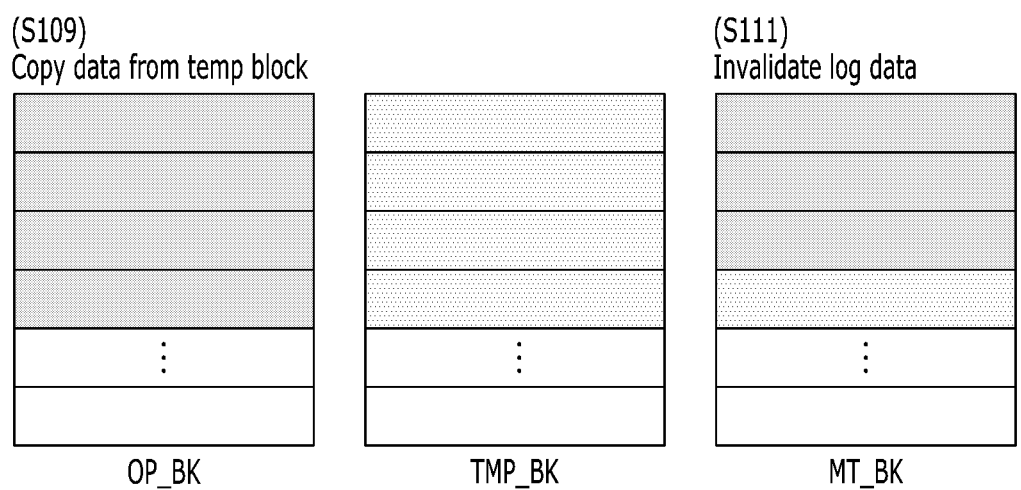

Referring to FIG. 5E, in operation S109, the processor 134 may copy temporary data, stored in the temporary block TMP_BK, to the erased open block OP_BK.

In operation S111, the processor 134 may invalidate the log data stored in the meta block MT_BK. When the log data indicating a location where the temporary data is stored is invalidated, the temporary data may also be invalidated because the processor 134 cannot access the location by using the invalidated log data. A page in which the log data is stored and a page in which the temporary data is stored, both are illustrated in FIGS. 5C and 5D, are respectively indicated as invalid pages in FIG. 5E.

The sudden power-off recovery operation according to the present embodiment may include operations S101, S103, S105, S107, S109 and S111. When the sudden power-off recovery operation is completely performed, the damaged data of the open block OP_BK may be replaced with reliable data.

When FIGS. 5A and 5E are compared, the data stored in the open block OP_BK before the sudden power-off recovery operation is performed may be stored in the same open block OP_BK after the sudden power-off recovery operation is performed. In addition, map data of the data stored in the open block OP_BK may not be changed. Accordingly, the processor 134 may access the data stored in the open block OP_BK, just as before the sudden power-off occurs. In addition, the processor 134 may successively store new data in the erased page of the open block OP_BK.

According to an embodiment, the processor 134 may maintain the open block identification information even after copying the data of the open block OP_BK to the temporary block TMP_BK so as to recover the open block OP_BK. Accordingly, the processor 134 may repeatedly perform the recovery operation on the existing open block OP_BK whenever repeatedly performing the sudden power-off recovery operation instead of performing the sudden power-off recovery operation on a new free block. Therefore, the processor 134 may not consume a free block whenever the processor 134 repeatedly performs the sudden power-off recovery operation, and thus the free block of the memory device 150 may not be exhausted.

FIG. 6 is a flowchart illustrating a power cycle of the memory system 110 in accordance with an embodiment of the present disclosure.

Operations S101, S103, S105, S107, S109 and S111 of FIG. 6 may correspond to operations S101, S105, S107, S109 and S111 described with reference to FIGS. 5B to 5E.

When the memory system 110 is powered up, the processor 134 may detect whether sudden power-off has occurred, in operation S601.

When it is detected that the sudden power-off has occurred, the processor 134 may search the meta block MT_BK and determine whether valid log data is stored in the meta block MT_BK, in operation S603.

When the valid log data is not stored in the meta block MT_BK (that is, "NO" in operation S603), the processor 134 may perform a sudden power-off recovery operation, starting from operation S101.

As a first example, when the sudden power-off recovery operation is not performed in a previous power cycle, the processor 134 may perform operation S101. As a second example, even when the sudden power-off occurs while performing operations S101, S103 and S105 in the previous power cycle, the processor 134 may perform the sudden power-off recovery operation, starting from operation S101.

In operation S101, the processor 134 may select the temporary block TMP_BK from the free blocks, and control the memory device 150 to erase the temporary block TMP_BK.

For example, the sudden power-off may occur before data of the open block OP_BK is copied to a previous temporary block in the previous power cycle and log data is written into the meta block MT_BK. Data stored in the previous temporary block may not be accessed with reference to the meta block MT_BK in a current power cycle. Accordingly, the previous temporary block may be determined as a free block, in which only invalid data is stored, in the current power cycle. The processor 134 may select a current temporary block TMP_BK from free blocks including the previous temporary block, and control the memory device 150 to erase the temporary block TMP_BK.

In operation S103, the processor 134 may copy the data of the open block OP_BK to the temporary block TMP_BK.

Even after the data of the open block OP_BK is copied to the previous temporary block in the previous power cycle, open block identification information and map data of the data may be maintained. The processor 134 may still identify the previous open block, as the open block OP_BK, based on the open block identification information. The processor 134 may access the data of the open block OP_BK based on the map data.

In operation S105, the processor 134 may store the log data, which indicates that the data of the open block OP_BK has been copied to the temporary block TMP_BK, in the meta block MT_BK.

In operation S107, the processor 134 may control the memory device 150 to erase the open block OP_BK.

In operation S109, the processor 134 may copy the data of the temporary block TMP_BK to the erased open block OP_BK.

In operation S111, the processor 134 may invalidate the temporary data, stored in the temporary block TMP_BK, by invalidating the log data.

When the valid log data is stored in the meta block MT_BK (that is, "YES" in operation S603), the processor 134 may perform a sudden power-off recovery operation, starting from operation S107.

For example, in case sudden power-offs occur many times, a sudden power-off may occur while data of the temporary block TMP_BK is copied to the erased open block OP_BK in a previous power cycle. The processor 134 may identify the previous open block OP_BK and the previous temporary block TMP_BK in a current power cycle with reference to open block identification information and log data stored in the meta block MT_BK. The processor 134 may erase the open block OP_BK again in the current power cycle, copy temporary data of the temporary block TMP_BK to the open block OP_BK, and invalidate the log data.

When the sudden power-off recovery operation up to operation S111 is completely performed, the memory system 110 may perform a normal operation in operation S605.

For example, the processor 134 may access the open block OP_BK with reference to the map data of the meta block MT_BK, and successively store new data in an erased page of the open block OP_BK.

According to an embodiment, even though the memory system 110 repeatedly performs the sudden power-off recovery operation, the operation of generating a new open block for each power cycle is prevented, and thus free blocks may be prevented from being exhausted early. When the free blocks are not exhausted early, the memory system 110 may be used normally until the lifespan of the memory blocks are exhausted. Accordingly, the lifespan of the memory system 110 may be improved.

When valid log data is stored in the memory device 150, the memory system 110 may start from the operation of erasing the open block OP_BK instead of starting the sudden power-off recovery operation from the beginning. Accordingly, when the sudden power-off recovery operation is repeatedly performed, time required for sudden power-off recovery of the memory system 110 may be reduced.

In addition, the memory system 110 maintains the map data of the open block OP_BK while the sudden power-off recovery operation is performed, thereby completely performing the sudden power-off recovery operation without excessive modification and rollback of the map data. When the sudden power-off recovery operation is completely performed, the memory system 110 may access the existing open block OP_BK. Accordingly, the performance of the memory system 110 may be improved.

According to the embodiments of the present disclosure, it is possible to provide a memory system and an operating method thereof capable of performing a sudden power-off recovery operation.

Although a memory system and an operating method thereof have been described with respect to specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed based on the present specification, and it is apparent that such changes or modifications also fall within the scope of the present disclosure and the following claims. Furthermore, the embodiments may be combined to form additional embodiments.

What is claimed is:

1. An operating method of a memory system that includes a plurality of memory blocks, the operating method comprising:
   a first step of copying, after a sudden power-off, data stored in an open block to a selected block among the plurality of memory blocks;
   a second step of erasing the open block; and
   a third step of copying the data, which is copied to the selected block, to the erased open block,
   wherein the open block and the selected block include non-volatile memory cells.

2. The operating method of claim 1, further comprising: storing valid log data in a meta block in response to completion of the first step.

3. The operating method of claim 2, wherein the valid log data indicates that the data of the open block is copied to the selected block.

4. The operating method of claim 2, further comprising invalidating the valid log data, which is stored in the meta block, in response to completion of the third step.

5. The operating method of claim 2, wherein the performing of second step comprises:
   identifying the open block based on open block identification information associated with the open block, which is maintained in a previous power cycle, when the valid log data is stored in the meta block;
   identifying the selected block, which is used in the previous power cycle, based on the valid log data; and
   erasing the open block based on the identified open block and the selected block when the memory system is powered up.

6. The operating method of claim 2, wherein the performing of the first step comprises:
   identifying the open block based on the open block identification information associated with the open block, which is maintained in a previous power cycle, when invalid log data is stored in the meta block; and
   copying the data of the open block to the selected block based on the identified open block when the memory system is powered up.

7. The operating method of claim 1,
   further comprising performing a normal operation in response to completion of the third step,
   wherein the performing of the normal operation comprises successively storing new data in an erased page of the open block.

8. The operating method of claim 7, wherein the performing of the normal operation further comprises accessing the open block with reference to map data associated with the open block.

9. The operating method of claim 1, wherein the first step comprises:
   performing an error correction decoding operation on the data of the open block, and loading the error correction decoded data into a volatile memory; and performing an error correction encoding operation on the loaded data and storing the error correction encoded data in the selected block.

10. The operating method of claim 1, wherein the selected block includes a temporary block.

11. A memory system comprising:
    a memory device including a plurality of memory blocks; and
    a controller suitable for controlling the memory device,
    wherein the controller is further suitable for:
    copying, after a sudden power-off, data of an open block to a selected block among the plurality of memory blocks,
    erasing the open block, and
    copying the data, which is copied to the selected block, to the erased open block,
    wherein the open block and the selected block include non-volatile memory cells.

12. The memory system of claim 11, wherein the controller is further suitable for:
    storing valid log data in a meta block when the data of the open block is copied to the selected block.

13. The memory system of claim 12, wherein the valid log data indicates that the data of the open block is copied to the selected block.

14. The memory system of claim 12, wherein the controller is further suitable for invalidating the valid log data, which is stored in the meta block, when the data copied to the selected block is copied to the open block.

15. The memory system of claim 12, wherein the controller performs an operation of erasing the open block identified based on open block identification information associated with the open block, which is maintained in a previous power cycle, when the valid log data is stored in the meta block and the memory system is powered up.

16. The memory system of claim 12, wherein the controller copies the data of the open block to the selected block among the plurality of memory blocks, based on open block identification information associated with the open block, which is maintained in a previous power cycle, when invalid log data is stored in the meta block and the memory system is powered up.

17. The memory system of claim 11, wherein the controller is further suitable for performing, after copying the data from the selected block to the erased open block, a normal operation by successively storing new data in an erased page of the open block.

18. The memory system of claim 11, wherein the controller is further suitable for performing, after copying the data from the selected block to the erased open block, a normal operation by accessing the open block with reference to map data associated with the open block.

19. The memory system of claim 11, wherein the controller copies the data of the open block to the selected block by:
    performing an error correction decoding operation on the data of the open block and loading the error correction decoded data into a volatile memory, and
    performing an error correction encoding operation on the loaded data and storing the error correction encoded data in the selected block.

20. A method of performing a sudden power-off recovery operation, the method comprising:
    copying, when log information is not yet written into a third memory unit, write data from a first memory unit to a second memory unit while keeping, in the third memory unit, map data and identification information of the first memory unit;
    writing the log information into the third memory unit, the log information representing the copying;
    erasing the first memory unit; and moving the write data from the second memory unit to the erased first memory unit while invalidating the log information in the third memory unit, wherein the first memory unit and the second memory unit include non-volatile memory cells.

21. The method of claim 20, wherein the copying includes performing an error-correction operation on the write data.

* * * * *